(12) United States Patent
Adams et al.

(10) Patent No.: US 7,789,957 B2
(45) Date of Patent: Sep. 7, 2010

(54) LOW-DUST ADDITIVE AND PIGMENT BLENDS WITH IMPROVED COLOR

(75) Inventors: John Adams, The Woodlands, TX (US); Roger Reinicker, Hockessin, DE (US); Damien Thurber Cole, Drexel Hill, PA (US); Gerard Finnegan, Wilmington, DE (US)

(73) Assignee: Ciba Corporation, Tarrytown, NY (US)

( * ) Notice: Subject to any disclaimer, the term of this patent is extended or adjusted under 35 U.S.C. 154(b) by 0 days.

(21) Appl. No.: 12/070,202

(22) Filed: Feb. 15, 2008

(65) Prior Publication Data

US 2008/0306186 A1 Dec. 11, 2008

Related U.S. Application Data

(60) Provisional application No. 60/933,410, filed on Jun. 6, 2007.

(51) Int. Cl.
C08K 5/05 (2006.01)
C08K 5/105 (2006.01)

(52) U.S. Cl. ............... 106/493; 106/499; 524/236; 524/379

(58) Field of Classification Search ............... 524/1, 524/236, 379; 106/493, 499
See application file for complete search history.

(56) References Cited

U.S. PATENT DOCUMENTS

| 4,055,439 | A | 10/1977 | Bäbler et al. ............ 106/288 |
| 5,047,460 | A | 9/1991 | Kletecka et al. |
| 5,176,751 | A * | 1/1993 | Findley ............ 106/502 |
| 6,040,225 | A | 3/2000 | Boles |
| 6,187,859 | B1 | 2/2001 | Humphrey et al. |
| 6,251,574 | B1 * | 6/2001 | Hubsch ............ 430/466 |
| 6,306,940 | B1 * | 10/2001 | Disch et al. ............ 524/100 |
| 6,369,131 | B1 | 4/2002 | Cerea ............ 523/223 |
| 6,596,073 | B1 | 7/2003 | Nyssen et al. ............ 106/499 |
| 7,029,818 | B2 | 4/2006 | Rohr et al. ............ 430/137.15 |
| 7,033,429 | B2 | 4/2006 | Balliello ............ 106/499 |
| 2003/0101908 | A1 | 6/2003 | Hayashi et al. |
| 2005/0106657 | A1 | 5/2005 | Marcos Rodriguez et al. |
| 2005/0260145 | A1 | 11/2005 | Leigh et al. |
| 2006/0155007 | A1 | 7/2006 | Huber |

FOREIGN PATENT DOCUMENTS

| DE | 10228186 | | 1/2004 |
| EP | 0398235 | | 11/1990 |
| EP | 0704560 | | 4/1996 |
| EP | 0704560 | * | 1/1999 |
| EP | 1074587 | | 2/2001 |
| EP | 1101800 | | 5/2001 |
| EP | 1270686 | | 1/2003 |
| EP | 1342748 | | 9/2003 |
| EP | 1471151 | | 10/2004 |
| WO | 03102116 | | 12/2003 |

OTHER PUBLICATIONS

International Search Report dated May, 4, 2009.

* cited by examiner

*Primary Examiner*—Milton I Cano
*Assistant Examiner*—John Uselding
(74) *Attorney, Agent, or Firm*—Tyler A. Stevenson

(57) ABSTRACT

Solid, low dust pigment compositions are formed i by mixing pigments with certain polymer stabilizers under conditions wherein the stabilizers are in a liquefied state. The pigment compositions are easily handled and have a high color yield when incorporated into polymer substrates. In many cases, the color development attained is not readily achievable using pigment compositions comprising conventional carriers.

8 Claims, No Drawings

LOW-DUST ADDITIVE AND PIGMENT BLENDS WITH IMPROVED COLOR

This application claims benefit under 35 USC 119(e) of U.S. provisional application No. 60/933,410, filed Jun. 6, 2007, incorporated herein in its entirety by reference.

A low-dust pigment composition with good dispersion and excellent color strength is prepared by mixing one or more molten or liquefied polymer stabilizer, e.g., anti-oxidants, light stabilizers and the like, with one or more pigments resulting, after cooling, in a solid composition comprised predominately of pigment and stabilizer wherein the pigment is adhered to, and in direct contact with the now solidified stabilizer. The stabilizers replace and function as wetting agents in the pigment compositions as well as contribute to stabilization upon incorporation of the composition into polymer systems. In many cases, the low dust compositions thus prepared provide greater color strength when incorporated into a polymer than when the same combination of pigment(s) and stabilizer(s) are added to a polymer formulation without the formation of the pigment/stabilizer composition provided herein.

Methods of preparing the low dust pigment compositions include extrusion of a mixture comprising predominately the pigment and stabilizer, high shear mixing of stabilizer with pigment with little or no external heating wherein the heat generated by mixing at high shear is enough to liquefy the stabilizer component, and mixing with low shear using additional applied heating.

BACKGROUND OF THE INVENTION

Among the common additives found in polymer compositions are colorants, such as pigments, and stabilizers, such as anti-oxidants and light stabilizers. Many commercial polymeric materials need stabilizers both for processing and long term aging, while pigments of course offer a full range of color options with good durability.

In order to obtain good color properties, as well as to prevent polymer processing problems, pigments are often treated or processed in some way prior to incorporation into a polymer system. Such pre-treatment of the pigment can, for example, provide better handling properties such as easier pigment flow or reduced pigment dusting and/or prevent the pigment from clumping together during processing to give better dispersion of the pigment in the polymer which can result in a higher color yield.

For Example, U.S. Pat. Nos. 7,033,429; 7,029,818; 6,596,073; 6,369,131 and 4,5055,439, all incorporated herein in their entirety by reference, disclose ways of preparing easily handled, low dust pigment preparations of organic and inorganic pigments. Frequently employed materials in such preparations include surfactants, wetting agents, waxes, polymer resins and the like.

However, one must be aware of the interactions between the components of a pigment formulation and the other additives found in the polymer system. Some of these interactions may have a negative impact not just on processing, but on the resulting color as well.

It has been found that the need for the aforementioned additives, i.e., surfactants, wetting agents, waxes, polymer resins etc, can be reduced or eliminated by the low dust pigment compositions of the present invention. These easily handled, high color yield compositions are readily formed in a straightforward manner by mixing pigments with certain polymer stabilizers under conditions wherein the stabilizers are in a liquefied state. In many cases, the color development attained is not readily achievable by conventional carriers.

DESCRIPTION OF THE INVENTION

A method for preparing a solid, low-dust pigment composition is provided, said pigment composition comprising a) 1 to 99% of one or more organic and/or inorganic pigment, b) 1 to 99% of one or more polymer stabilizer selected from primary antioxidants, secondary antioxidants, hindered amine light stabilizers, ultraviolet absorbers and blends of said polymer stabilizers, wherein the selected stabilizer or blend of stabilizers has a melting point of 200° C. or less, for example 170° C. or less, for example 150° C. or less, in a weight ratio of a) to b) of from about 19:1 to about 1:19, and c) less than 30%, frequently less than 20% and typically less than 10%, for example 5%-0% by weight of components other than a) and b), wherein the pigment is adhered to, in direct contact with, the stabilizer, which method comprises combining one or more organic and/or inorganic pigment a) with one or more polymer stabilizer or stabilizer blend b) in a ratio of a) to b) of from about 19:1 to about 1:19 and optionally one or more component c) to form a mixture which is subjected to mixing under conditions wherein the stabilizer component is in a liquefied or molten state, optionally in the presence of other inert separable materials, which mixing occurs by extrusion of a mixture comprising predominately the pigment and stabilizer, high shear mixing of stabilizer with pigment with little external heating or no external heating wherein the heat generated by the mixing at high shear is enough to create liquefaction of the stabilizer component, or mixing with low shear using additional applied heating, followed by cooling of the composition to form a solid.

Typically, at least 50% by weight of the material present during the mixing of the liquefied stabilizer with pigment a) and component c) is composed of the combined weight of pigment component a) and stabilizer component b). In one embodiment the only materials present during the mixing are components a), b) and c); of course, when the amount of c) is 0% in this embodiment only the components a) and b) are present.

"Other inert separable materials" refers to materials that are not incorporated into the final pigment composition and have little to no impact the process of its preparation. These materials include, for example, water that may be present in a pigment press cake when the pigment of the invention is added to the process in that form, certain processing aids or other materials that are readily separated from the composition at a later stage if desired.

It must be noted that the low dust pigment composition being described herein relates to the solid obtained from the process wherein the combination of pigment component a) and stabilizer component b) makes up at least at least about 70% of the solid, typically 90% of the solid, often at least 95% of the solid, for example at 98 to 100% of the solid, in which solid the pigment is adhered to, in direct contact with, the stabilizer. Any amount of component c) that may be present is incorporated as an integral part of this solid. Therefore, any inert separable materials that may be present during the mixing process to prepare the solid pigment composition are chosen so that they can be separated by ordinary means, such as washing, filtering, drying etc, but such separation is not necessary depending on subsequent processing steps or final use of the pigment composition.

Typically such inert separable materials are separated from the pigment composition and, in many embodiments of the invention, such materials are absent during the mixing of liquefied stabilizer and pigment.

"Other inert separable materials" are differentiated from the "components other than a) and b)" of component c), in that components of c) become an integrated part of the solid pigment composition. The elements of component c) are materials typically found in pigment or polymer formulations and are discussed in greater detail below. In one embodiment of the invention, there is 0% of component c), that is, the pigment composition comprises only pigment component a) and stabilizer component b); in other embodiments there is less than 5%, for example 2% or less, for example 1% of component c).

The terms 'liquefied' or 'liquefaction' are used herein to denote that while at least one component of the stabilizer component b) is in the molten state it is possible to use a blend of stabilizers wherein one stabilizer melts and dissolves any remaining non-molten stabilizer component. In one special case, the stabilizer is mixed under the severe mixing conditions of the extrusion process creating the end result of forcing the stabilizer into direct adherence to the pigment and is considered the equivalent of liquefaction.

The components a), b) and c) are mixed under conditions wherein the stabilizer component is in a liquefied state. This allows the stabilizer to completely or partially surround the pigment and make direct contact with it. Any of minor component c) which may be present is also incorporated by the liquefied stabilizer and becomes part of the solid composition upon cooling. The thus formed inventive pigment composition can then be further processed into any type of solid form, e.g., appropriately sized particles.

While it is known that pigments may be loosely blended with stabilizers prior to incorporation into a polymer formulation, such loose mixtures of separate components are not the pigment composition of the invention. In the present invention, the pigment, the stabilizer and any component c) are all an integral part of a single solid which comprises a pigment coated in part or in total by the stabilizer and formed under the conditions herein described. The present pigment compositions have numerous advantages over the simple blends as described, in particular, the present compositions are low dust materials and are capable of providing better color than what is obtained when the individual components are simply mixed and added to the polymer.

In one embodiment this mixing occurs by extruding a mixture containing predominately components a) and b) at temperatures of between room temperature to up to about 200° C., for example, they are extruded in a short barrel single screw extruder operating at temperatures of about 50° C. up to about 200° C., for example, temperatures from about 120° C. to about 180° C. or 150° C. to about 180° C. In such a process, the stabilizer component is typically molten, however, in certain circumstances, good results in creating the low dust pigment composition wherein the pigment is directly adhered to the stabilizer can be obtained under conditions where the stabilizer softens and engulfs the pigment without fully melting. Such stabilizer softening under these conditions constitute the special liquefaction case referred to above.

In another embodiment, mixing entails high shear mixing with little or no external heating. Under these high shear conditions, the energy or heat imparted to the system by mixing alone is typically enough to create liquefaction of the stabilizer component. In one embodiment, no external heating is applied at all. For example, the components are mixed in a Henschel mixer at high enough shear so that the stabilizer component b) is melted or liquefied without applying heat beyond that generated by the mixing to create a flux of pigment and stabilizer.

In another embodiment mixing occurs under conditions of lower shear, for example using a Z-blade mixer with jacket, wherein additional heating of from about 40° C. up to about 200° C., for example up to 150° C., for example up to about 120° C. is applied to melt or liquefy the stabilizer component.

After a), b) and any component c) are mixed to form the pigment composition, the composition is allowed to cool, or is actively cooled by for example an external water bath, external circulating water or some other means. The optional inert separable materials if present may be separated at this stage or a later stage by standard means.

In one particular embodiment, the pigment composition formed by any of the above mixing methods is then subjected to high shear mixing, or other agitation, for example with external cooling, to prepare pigment particles of the desired particle size.

Thus, the method of the invention provides a low-dust pigment composition, also referred to herein as simply a "pigment composition" "pigment formulation" or "pigment preparation", which consists predominately of pigment and the selected stabilizer wherein the weight ratio of pigment to stabilizer is from about 19:1 to about 1:19. That is, pigment composition which contains at least 70% by weight of a mixture of pigment and stabilizer, based on the total weight of the pigment composition. In many instances, the pigment composition contains at least 80%, 90%, 95%, 98%, 99% or is even 100% by weight of a mixture of pigment and stabilizer based on the total weight of the pigment composition.

Other components c) may be present in the pigment composition, but the total amount of components which are not pigment or the stabilizer of the invention are present in less than about 30% by weight based on the total weight of the pigment composition. In many instances, the pigment composition contains less than about 20%, typically less than about 10%, for example less than about 5%, 2% or 1%, or may even be 0% by weight of these other components based on the total weight of the pigment composition.

The components of c), when present, are components typically found in pigment or polymer formulations including other stabilizers, processing aids, other colorants such as dyes, fluorescent whitening agents, fillers, surfactants, polymer resins, plasticizers and other components used in commerce or mentioned in the literature. In one embodiment polymer resins are absent, in another embodiment waxes are absent. In a particular embodiment of the invention, the present pigment compositions contain no wax or polymer resin.

In another particular embodiment, the pigment composition is entirely or almost entirely comprised by a mixture of the pigment and stabilizer components which composition is obtained by the mixing of only these components or these components plus a small amount, less than 10%, for example less than 5%, for example 0% to 2% of any component c). While a small amount of a wax may be present, one advantage of the present invention is that a wax is in many instances no longer needed and can be avoided.

The weight ratio of pigment to stabilizer will vary depending on the specific pigment and phenol used and on the desired properties of the pigment composition. For example, the ratio of pigment to stabilizer can be 19:1, 10:1, 9:1, 7:1, 5:1, 4:1, 3:1, 2:1, 1:1, the inverse of these ratios, e.g., 1:2, 1:3 . . . 1:19, or any ratio in between, including fractional numbers instead of integers, such as 2.5:1 and 7.5:1 etc.

More than one pigment or stabilizer may be used. The pigment or pigments can be one or more organic pigments, one or more inorganic pigments or a mixture of organic and inorganic pigments.

The pigment used in the process can be in any form e.g., crude pigment, processed pigment, filter cake etc., and any particle size, for example as small as about 10 nm to 100 microns or larger, for example, from about 10 nm to about 100 microns, or from about 0.01 microns to about 50 microns, or from about 0.1 microns to about 50 microns, or from about 0.1 microns to about 20 microns, or from about 0.01 microns to about 5 microns, or from about 1 micron to about 100 microns.

The pigments suitable for the method according to the invention are, for example, those described under "pigments" in the Colour Index, 3rd Edition (3rd Revision 1987 including Additions and Amendments to No. 85).

Examples of suitable organic pigments include azo pigments, such as monoazo, disazo, Naphtol, and metal complex pigments, and also polycyclic pigments, such as isoindolinone and isoindoline pigments, thioindigo, thiazineindigo, quinophthalone, anthraquinone, dioxazine, phthalocyanine, quinacridone, perylene, perinone, diketopyrrolopyrrole, benzimidazolone and azomethine pigments, or mixtures or mixed crystals of said pigments. For example, the pigment may be selected from azo, Naphtol, isoindolinone and isoindoline pigments, thioindigo, anthraquinone, phthalocyanine, quinacridone, perylene, perinone, diketopyrrolopyrrole and benzimidazolone pigments.

Examples of overviews of commonly used inorganic or organic pigments can be found in K. Leissler and G. Rosch, Kunststoffe 1996, 86, 965, and also in Ullmann's Enyclopadie der technischen Chemie, 4th edition, Headings: Pigments: Introduction; Vol. 18, pp. 547 et seq., Organische Pigmente, Vol. 18, pp. 661 et seq.; Thieme Verlag Stuttgart, 1977. Suitable inorganic pigments are, for example, oxide pigments such as iron oxides, titanium dioxides, chromium oxides, zinc oxides, manganese iron oxides, nickel and chromium titanium dioxides, rutile mixed-phase pigments. Further inorganic pigments are zinc sulphides, ultramarine, sulphides of the rare earths, and bismuth vanadate.

Suitable inorganic fillers which are likewise understood as pigments in the context of this invention are, for example, inorganic compounds with a low coloring power, such as natural iron oxides, zinc sulphide, aluminium oxide, heavy spar, siliceous earth, silicates (mica, clay, talc), calcium carbonate and calcium sulphate.

Furthermore, depending on the field of use, the inorganic pigments may also have been organically or inorganically after treated.

Pigments of course can be complicated materials and frequently comprise more than a single compound and often contain more than just chromophoric components. For example, commercial pigments are often milled or ground with auxiliaries such as surfactants, resins and other materials. As a result, certain commercial pigments contain nonchromophoric material such as resins etc. Such pigments can be used in the present process.

Ready for use pigments preparations can also be used as pigment, i.e. preparations which contain in addition to the pigment 20 to 90%, for example 40 and 60%, of a carrier, provided that the low dust pigment composition ultimately produced comprises at least 70%, and more typically at least 90% of pigment and stabilizer as described above.

One embodiment of the invention relates to low-dust compositions of pigments with a tendency for compaction prepared and used according to this invention.

Many pigments are known to have a compaction tendency, for example: PO64, PY95, PO71, & PR220, & PR272. As a result they can be difficult to disperse in order to develop their full color value. To mitigate this, frequently low melting waxes, fPVC, phthalates are used as carriers prior to incorporation into the final thermoplastic material. However incorporation of these lower molecular weight carriers can compromise performance in particular applications without providing any benefit to stabilization of a plastic article during manufacture or field use. Applications for such pigments include gas or water pipes under pressure.

The current invention provides low-dust compositions of such compaction pigments which are not only easily handled but also demonstrate improved color development when incorporated in to the a thermoplastic resin. By using pigment compositions of the present invention one also avoids high amounts of traditional and potentially performance inhibiting carriers and introduces in their stead compounds which also act to stabilize the polymer.

The stabilizers of component b) in the present pigment composition are compounds useful in the stabilization of polymers, for example, primary antioxidants such as hindered phenols, hydroxyl amines and nitrones etc, secondary antioxidants such as phosphites etc, and light stabilizers such as hindered amine light stabilizers and UVAs. Examples of polymer stabilizers useful in the invention can be found in, for example, US Published Patent Application no. 20070050927, pages 6-11, the portions of which relating to polymer additives is incorporated herein by reference.

In many instances, the stabilizer of the low dust pigment composition would be a component of a polymer formulation into which the present pigment composition may be incorporated, however, prior formation of the stabilizer and pigment composition of the present invention provides advantages beyond those obtained by simply combining these components during polymer processing. For example, better pigment handling, better color and the elimination of traditional pigment carriers are all provided by embodiments of the invention.

The stabilizers of the present pigment composition either have a melting point of less than 200° C., or if a blend of more than one stabilizer is used at least one of the stabilizers of the blend has a melting point of less than 200° C.; or the stabilizer is a mixture of more than one stabilizer forming a eutectic with a melting point of less than 200° C. Typically the melting point is less than 170° C., frequently the selected stabilizers of the present pigment composition have a melting point of about 150° C. or less.

The stabilizers of the present pigment composition also have low enough volatility to not excessively volatilize during polymer processing. For example, the stabilizers have a molecular weight greater than 200, for example greater than 220, typically greater than 300, for example 500 or more. For example, the stabilizers of the present pigment composition have a molecular weight of at least 220, typically 340 or higher, often 500 or higher.

The stabilizers may be antioxidants, for example hindered phenol anti-oxidants, hydroxylamine antioxidants, benzofuranones or indolinones; secondary anti-oxidants such as phosphites, phosphonites or thiosynergists; blends of primary and secondary antioxidants; UV absorbers; hindered amine light stabilizers including hindered imino ethers and hindered hydroxylamines; nitrones or amine oxides as described, for example, in US Published Patent Application no.

20070050927, and combinations thereof provided that the stabilizers selected have the required melting point and molecular weight.

In one embodiment of the invention, the stabilizers of the low-dust pigment composition are phenols useful as anti-oxidants in polymer systems, for example, the hindered phenols, i.e., phenols substituted adjacent to the phenolic hydroxy group which have low enough volatility to be useful in polymer processing. In another embodiment, the stabilizer is a blend of hindered phenol and phosphite. Other combinations comprising hindered phenols and/or phosphites are also envisioned.

Excluded from the phenols of the present invention are compounds such as those of EP-A-0 258 651 which are commonly used as charge carriers.

For example, the phenols of the present invention have a molecular weight greater than 200 as detailed above for any stabilizer of component b) and are substituted adjacent to the phenolic hydroxy group by an alkyl group of 1-12 carbons, such as methyl, ethyl, iso-propyl, butyl, iso-butyl, t-butyl, pentyl, neopentyl, hexyl, 2-ethyl hexyl, octyl, t-octyl etc., for example, methyl, t-butyl, neo-pentyl, t-octyl, for example t-butyl.

If it is desired to include in the pigment composition a hindered phenol with a melting point of over 200° C. it must be combined with another stabilizer, as with any other stabilizer that melts over 200° C., so that either the blend of the stabilizers melts below 200° C. or at least one stabilizer present melts below 200° C. and liquefies the higher melting phenol.

The hindered phenol may be selected from the following classes of antioxidants described, for example, in US Published Patent Appl. No. 20070050927, pages 6-11: 1.1. Alkylated monophenols, 1.2. Alkylthiomethylphenols, 1.3. Hydroquinones and alkylated hydroquinones, 1.4. Tocopherols, 1.6. Alkylidenebisphenols, 1.7. Benzyl compounds, 1.8. Hydroxybenzylated malonates, 1.9. Aromatic hydroxybenzyl compounds, 1.11. Benzylphosphonates, 1.12. Acylaminophenols, 1.13. Esters of β-(3,5-di-tert-butyl-4-hydroxyphenyl)propionic acid, 1.14. Esters of β-(5-tert-butyl-4-hydroxy-3-methylphenyl)propionic acid, 1.15. Esters of β-(3,5-dicyclohexyl-4-hydroxyphenyl)propionic acid, 1.16. Esters of 3,5-di-tert-butyl-4-hydroxyphenyl acetic acid and 1.17. Amides of β-(3,5-di-tert-butyl-4-hydroxyphenyl)propionic acid.

For example, a hindered phenol antioxidant selected from the Alkylated monophenols, Alkylidenebisphenols, Hydroxybenzylated malonates, Aromatic hydroxybenzyl compounds, Esters of β-(3,5-di-tert-butyl-4-hydroxyphenyl) propionic acid, Esters of β-(5-tert-butyl-4-hydroxy-3-methylphenyl)propionic acid, and Esters of 3,5-di-tert-butyl-4-hydroxyphenyl acetic acid.

Alkylated monophenols include, for example, 2,6-di-tert-butyl-4-methylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxy-methylphenol, nonylphenols which are linear or branched in the side chains, for example, 2,6-di-nonyl-4-methylphenol, 2,4-dimethyl-6-(1-methylundec-1-yl)phenol, 2,4-dimethyl-6-(1-methylheptadec-1-yl)phenol, 2,4-dimethyl-6-(1-methyltridec-1-yl)phenol and mixtures thereof;

Alkylthiomethylphenols include, for example, 2,4-dioctylthiomethyl-6-tert-butylphenol, 2,4-dioctylthiomethyl-6-methylphenol, 2,4-dioctylthiomethyl-6-ethylphenol, 2,6-didodecylthiomethyl-4-nonylphenol;

Hydroquinones and alkylated hydroquinones include, for example, 2,6-di-tert-butyl-4-methoxyphenol, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis-(3,5-di-tert-butyl-4-hydroxyphenyl) adipate;

Alkylidenebisphenols include, for example, 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3-tert-butyl-4-hydroxyphenyl) butyrate], bis(3-tert-butyl-4-hydroxy-5-methyl-phenyl)dicyclopentadiene, bis[2-(3'tert-butyl-2-hydroxy-5-methylbenzyl)-6-tert-butyl-4-methylphenyl]terephthalate, 1,1-bis-(3,5-dimethyl-2-hydroxyphenyl)butane, 2,2-bis-(3,5-di-tert-butyl-4-hydroxyphenyl)propane, 2,2-bis-(5-tert-butyl-4-hydroxy2-methylphenyl)-4-n-dodecylmercaptobutane, 1,1,5,5-tetra-(5-tert-butyl-4-hydroxy-2-methylphenyl)pentane;

Benzyl compounds include, for example, 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, 1,3,5-tri-(3,5-di-tert-butyl-4-hydroxybenzyl)-2,4,6-trimethylbenzene, 3,5-di-tert-butyl-4-hydroxybenzyl-mercapto-acetic acid isooctyl ester, bis-(4-tert-butyl-3-hydroxy-2,6-dimethylbenzyl)dithiol terephthalate, 1,3,5-tris-(3,5-di-tert-butyl-4-hydroxybenzyl) isocyanurate, 1,3,5-tris-(4-tert-butyl-3-hydroxy-2,6-dimethylbenzyl) isocyanurate, 3,5-di-tert-butyl-4-hydroxybenzyl-phosphoric acid dioctadecyl ester and 3,5-di-tert-butyl-4-hydroxybenzyl-phosphoric acid monoethyl ester, calcium-salt;

Hydroxybenzylated malonates include, for example, dioctadecyl-2,2-bis-(3,5-di-tert-butyl-2-hydroxybenzyl)-malonate, di-octadecyl-2-(3-tert-butyl-4-hydroxy-5-methylbenzyl)-malonate, di-dodecylmercaptoethyl-2,2-bis-(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate;

Aromatic hydroxybenzyl compounds include, for example, 1,3,5-tris-(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol;

Benzylphosphonates include, for example, dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid;

Acylaminophenols include, for example, 4-hydroxy-lauric acid anilide, 4-hydroxy-stearic acid anilide, 2,4-bis-octylmercapto-6-(3,5-tert-butyl-4-hydroxyanilino)-s-triazine and octyl-N-(3,5-di-tert-butyl-4-hydroxyphenyl)-carbamate;

Esters of β-(3,5-di-tert-butyl-4-hydroxyphenyl)propionic acid include, for example, ester with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane;

Esters of β-(5-tert-butyl-4-hydroxy-3-methylphenyl)propionic acid include, for example, esters with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane;

Esters of β-(3,5-dicyclohexyl-4-hydroxyphenyl)propionic acid include, for example, esters with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol;

Esters of 3,5-di-tert-butyl-4-hydroxyphenyl acetic acid include, for example, esters with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol;

Amides of β-(3,5-di-tert-butyl-4-hydroxyphenyl)propionic acid include, e.g. N,N'-bis(3,5-di-tert-butyl-4-hydroxyphenylpropionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide.

In one embodiment of the invention the pigment composition comprises as the stabilizer component one or more hindered phenol of the appropriate molecular weight and melting point selected from:

2,6-di-tert-butyl-4-methylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1-methylundec-1-yl)phenol, 2,4-dimethyl-6-(1-methylheptadec-1-yl)phenol, 2,4-dimethyl-6-(1-methyltridec-1-yl)phenol and mixtures thereof;

2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol;

2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylene-bis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3-tert-butyl-4-hydroxyphenyl)butyrate], bis(3-tert-butyl-4-hydroxy-5-methyl-phenyl)dicyclopentadiene, bis[2-(3'tert-butyl-2-hydroxy-5-methylbenzyl)-6-tert-butyl-4-methylphenyl]terephthalate, 1,1-bis-(3,5-dimethyl-2-hydroxyphenyl)butane, 2,2-bis-(3,5-di-tert-butyl-4-hydroxyphenyl)propane, 2,2-bis-(5-tert-butyl-4-hydroxy2-methylphenyl)-4-n-dodecylmercaptobutane, 1,1,5,5-tetra-(5-tert-butyl-4-hydroxy-2-methylphenyl)pentane;

1,3,5-tris-(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol;

Esters of β-(3,5-di-tert-butyl-4-hydroxyphenyl)propionic acid, β-(5-tert-butyl-4-hydroxy-3-methylphenyl)propionic acid or 3,5-di-tert-butyl-4-hydroxyphenyl acetic acid with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, trimethylhexanediol or trimethylolpropane.

In one embodiment of the invention the pigment composition comprises as the stabilizer component one or more hindered phenol of the appropriate molecular weight and melting point selected from Esters of β-(3,5-di-tert-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, diethylene glycol, triethylene glycol, pentaerythritol, trimethylhexanediol or trimethylolpropane;

for example, an esters of β-(3,5-di-tert-butyl-4-hydroxyphenyl)propionic acid with octadecanol or pentaerythritol.

In one embodiment the stabilizer component b) comprises a phosphite or a blend of hindered phenol and phosphite. In one particular embodiment, the stabilizer comprises a blend of an esters of β-(3,5-di-tert-butyl-4-hydroxyphenyl)propionic acid with a tris-phenyl phosphite.

In one embodiment of the invention, the stabilizer component b) comprises a hydroxyl amine such as a dialkyl hydroxylamine, dibenzyl hydroxylamine etc.

In one embodiment of the invention, the stabilizer component b) comprises a UV absorber such as 2-(2-Hydroxyphenyl)-2H-benzotriazoles, 2-Hydroxybenzophenones, Esters of substituted and unsubstituted benzoic acids, acrylates or malonates. For example, in one embodiment of the invention the stabilizer component comprises one or more UV absorber of the appropriate molecular weight and melting point selected from 4-octyloxy-2-hydroxybenzophenone, 4-methoxy-2-hydroxybenzophenone, 4-dodecyloxy-2-hydroxybenzophenone, 2-(2-hydroxy-5-methylphenyl)-2H-benzotriazole, 2-(2-hydroxy-5-tert-octylphenyl-2H-benzotriazole, 2-(2-hydroxy-3,5-di-tert-amylphenyl)-2H-benzotriazole, octyl 3-(benzotriazol-2-yl)-5-tert-butyl-4-hydroxyhydrocinnamate, octyl 3-(5-chloro-benzotriazol-2-yl)-5-tert-butyl-4-hydroxyhydrocinnamate, 2-(2-hydroxy-3,5-di-tert-butylphenyl)-2H-benzotriazole, 2-(2-hydroxy-5-tert-butylphenyl)-2H-benzotriazole, 5-chloro-2-(2-hydroxy-3,5-di-tert-butylphenyl)-2H-benzotriazole, 5-chloro-2-(2-hydroxy-3-tert-butyl-5-methylphenyl)-2H-benzotriazole, 2-(2-hydroxy-3-sec-butyl-5-tert-butyl-phenyl)-2H-benzotriazole, 2-(2-hydroxy-3-dodecyl-5-methylphenyl)-2H-benzotriazole, 2-[2-hydroxy-3,5-di(α,α-dimethylbenzyl)phenyl]-2H-benzotriazole, 2-[2-hydroxy-3-(α,α-dimethylbenzyl)-5-tert-octylphenyl]-2H-benzotriazole, 2-{2-hydroxy-3-tert-butyl-5-[2-(omega-hydroxy-octa(ethyleneoxy)carbonyl)ethyl]phenyl}-2H-benzotriazole, 2-ethylhexyl p-methoxycinnamate, ethyl 2-cyano-3,3-diphenylacrylate, 2-ethylhexyl 2-cyano-3,3-diphenylacrylate, 4-methoxy-2,2'-dihydroxybenzophenone, 4,4'-dimethoxy-2'-dihydroxybenzophenone, 2,4-bis(2,4-dimethylphenyl)-6-(2-hydroxy-4-octyloxy-phenyl)-s-triazine, 2,4-diphenyl-6-(2-hydroxy-4-hexyloxyphenyl)-s-triazine, 2,4-bis(2,4-dimethylphenyl)-6-[2-hydroxy-4-(3-do-/tri-decyloxy-2-hydroxypropoxy)phenyl]-s-triazine, 2,4-bis(2,4-dimethylphenyl)-6-[2-hydroxy-4-(3-do-/tri-decyloxy-2-hydroxypropoxy)-5-α-cumylphenyl]-s-triazine, the reaction product of 2,4,6-tris(2,4-dihydroxyphenyl)-s-triazine with octyl α-haloacetate, dimethyl p-methoxybenzylidenemalonate, or di-(1,2,2,6,6-pentamethylpiperidin-4-yl) p-methoxybenzylidenemalonate.

For example, a UV absorber is selected from 4-octyloxy-2-hydroxybenzophenone, 4-dodecyloxy-2-hydroxybenzophenone, 2-(2-hydroxy-5-methylphenyl)-2H-benzotriazole, 2-(2-hydroxy-5-tert-octylphenyl-2H-benzotriazole, 2-(2-hydroxy-3,5-di-tert-amylphenyl)-2H-benzotriazole, 2-(2-hydroxy-3-dodecyl-5-methylphenyl)-2H-benzotriazole, 2-[2-hydroxy-3,5-di(α,α-dimethylbenzyl)phenyl]-2H-benzotriazole and 2-[2-hydroxy-3-(α,α-dimethylbenzyl)-5-tert-octylphenyl]-2H-benzotriazole.

In one embodiment of the invention, the stabilizer component b) comprises a sterically hindered amine stabilizer such as derivatives of 2,2,6,6-tetramethylpipridine derivatives such as N—H, N-alkyl and N-acyl, NOH, NO-alkyl, NO-substituted alkyl derivatives. Known hindered amine light stabilizers include small molecule compounds and oligomeric and polymeric compounds. For example, in one embodiment of the invention the stabilizer component comprises one or more hindered amine light stabilizer of the appropriate molecular weight and melting point selected from bis(2,2,6,6-tetramethyl-4-piperidyl)succinate, bis(1,2,2,6,6-pentamethyl-4-piperidyl) succinate, 1,1'-(1,2-ethanediyl)-bis(3,3,5,5-tetramethylpiperazinone), 3-n-octyl-7,7,9,9-tetramethyl-1,3,8-triazaspiro[4.5]decan-2,4-dione, bis(2,2,6,6-tetramethylpiperidin-4-yl) sebacate, bis(1,2,2,6,6-pentamethylpiperidin-4-yl) sebacate, 4-stearyloxy-2,2,6,6-tetramethyl-piperidine, 4-$C_{15}$-$C_{17}$alkanoyloxy-2,2,6,6-tetramethylpiperidine, bis(1-octyloxy-2,2,6,6-pentamethylpiperidin-4-yl) sebacate, bis(1-(hydroxydimethylethyl)-2,2,6,6-pentamethylpiperidin-4-yl) sebacate, polycondensation product of 1-(2-hydroxyethyl)-2,2,6,6-tetramethyl-4-hydroxypiperidine and succinic acid. A variety of other commercially available hindered amine light stabilizers are also known and may also be used.

For example, a hindered amine is selected from bis(2,2,6,6-tetramethylpiperidin-4-yl) sebacate, bis(1,2,2,6,6-pentamethylpiperidin-4-yl) sebacate, 4-stearyloxy-2,2,6,6-tetramethylpiperidine, 4-$C_{15}$-$C_{17}$alkanoyloxy-2,2,6,6-tetramethylpiperidine and bis(1-(hydroxydimethylethyl)-2,2,6,6-pentamethylpiperidin-4-yl) sebacate.

Such phenol, phosphite, UV absorber and hindered amine compounds are well known items of commerce.

As stated above, blends of different types of stabilizers and/or blends of different members of a stabilizer class can be effectively used, for example, a hindered amine and a UV absorber, a hindered phenol and a phosphite, a hydroxylamine with a hindered amine and a UV absorber, etc.

Many commercially available blends of polymer stabilizers also include other agents such as calcium stearate etc; many such blends also find use in the present invention.

The mixing process wherein the liquefied stabilizer is blended with the pigment can take place in any appropriate device or vessel, for example, an extruder such as a short barrel extruder, a mixer such as a Henschel mixer, Z-Blade mixer etc, or any other device common in the art.

For example, one or more organic pigments and one or more stabilizers in one of the ratios above are fluxed in a mixer, for example a Henschel mixer at a speed of, for example from about 1000 to about 4,000 rpm, or from about 1500 to about 3,500 rpm, or from about 2,000 to about 3,500 rpm for about 1 to about 30 minutes, for example from about 5 to about 20 minutes, for example from about 7 to about 15 minutes without external heating to create clumps. Water is then circulated to cool the unit and then the clumps are broken into small granules by pulsing the agitator.

For example, one or more organic pigment, one or more inorganic pigment and one or more hindered phenol antioxidant are fluxed as above, for example the fluxing takes place in the presence of less than 10% other additives.

For example, an organic pigment, an inorganic pigment a hindered phenol, a phosphite and a hindered amine are mixed in a Z-Blade mixer heated at 150° C. in the presence of about 1 weight % of a metal stearate and about 2% calcium carbonate.

For example, an organic pigment, a hindered phenol, a phosphite and a small amount of calcium stearate are mixed in a short barrel single screw extruder operating at 150° C. to 180° C.

As stated above, the pigment composition once prepared can be further processed into various solid forms. For example, the low-dust pigment compositions of the invention are prepared in almost any particle size, for example as small as about 0.01 microns to 100 microns or larger, for example, from about 1 micron to about 100 microns, or from about 0.01 microns to about 50 microns, or from about 0.1 microns to about 50 microns, or from about 0.1 microns to about 20 microns, or from about 0.01 microns to about 5 microns, or from about 0.5 microns to about 5 microns.

The low-dust pigment composition of the invention is easily handled and disperses readily into polymer systems with excellent color strength. Also provided are colored polymer systems prepared by incorporating the low-dust pigment composition into polymer systems and processes for incorporation.

Such polymer systems include those found in plastics and coatings, which polymer systems may include other additives. Examples of useful natural and synthetic polymers and additives frequently employed therein are described in US Published Patent Application no. 20070050927, pages 4-11, the portions of the disclosure relating to polymers and additives incorporated herein by reference.

Polymeric materials, or polymeric substrates, include thermoplastic, thermoset, elastomeric, inherently crosslinked or crosslinked polymers.

The thermoplastic, crosslinked or inherently crosslinked polymer is, for example, a polyolefin, polyamide, polyurethane, polyacrylate, polyacrylamide, polyvinyl alcohol, polycarbonate, polystyrene, polyester, polyacetal or halogenated vinyl polymer such as PVC.

The polymers may be, for example, in the form of films, injection-moulded articles, granules, extruded workpieces, fibres, sheets, coatings, felts or woven fabrics.

For example, the low-dust pigment compositions are incorporated into a plastic film, injection-molded article, granule, extruded workpiece, fibre or sheet.

The coloring of the polymeric systems using the low-dust pigment compositions according to the invention is carried out according to methods known per se, for example, by using rolling mills, mixing apparatus, grinding apparatus, pouring, calendering, compression moulding, extrusion, coating, spinning, Brabender melt processing, film formation, injection molding, blow molding, etc.

The low-dust pigment compositions according to the invention are added to the polymers in concentrations similar to those when using other pigment preparations, however, in many cases, less of the actual pigment may be needed due to the excellent color strength of the inventive pigment compositions. This offers economic advantages when using, for example, more costly certain high performance pigments.

When added to polymers, the low-dust pigment compositions as prepared according to the invention provide better color strength than when the pigment and stabilizer are added to the polymer without fluxing to form the present pigment composition.

The present invention allows one to prepare, as particles or any other solid form, pigment compositions which are easily handled and readily dispersed without the need for preparing a pigment flush or other pigment formulation and in many cases eliminates the need for waxes and other traditional carriers. Such carriers, which in most instances offer no added value to the final polymer formulation, are replaced by polymer stabilizers. Surprisingly, in many cases, the pigment composition of the present invention provides greater color strength when incorporated into polymer formulations than polymer formulations which contain both the pigment and selected stabilizer of the fluxed composition, but wherein the pigment and stabilizer composition of the present invention was not prepared prior to polymer processing.

EXAMPLES

As elsewhere in the application, percentages and ratios are by weight.

Peparation of Pigment Compositions

Example 1

800 grams of the pigment CROMOPHTAL® Orange GP and 800 grams of the hindered phenol IRGANOX® 1010 are fluxed in a Henschel mixer at 3050 rpm for 10 minutes to create clumps. Water is then circulated to cool the unit and then the clumps are broken up into small granules by pulsing the agitator. The granules demonstrate less dusting when poured onto a surface relative to the starting toner.

Example 2

800 grams of the pigment CROMOPHTAL® Orange GP and 800 grams of the hindered phenol IRGANOX® 1076 are fluxed in a Henschel mixer at 2000 rpm for 11 minutes to form clumps. Water is then circulated to cool the unit and then the clumps are broken up into small granules by pulsing the agitator. The granules demonstrate less dusting when poured onto a surface relative to the starting toner.

Example 3

360 grams of hindered phenol IRGANOX® 1076 and 80 grams of hydroxylamine stabilizer IRGASTAB® FS-042 are melted at 95° C. in a Z-blade mixer. To the melt is added 440 grams of the pigment CROMOPHTAL® Yellow HRPA. The mixture is then mixed to wet the pigment. The resulting mixture is cooled to room temperature and broken up into granules. Color development reached 100% international standard depth of shade.

Example 4

182 grams of the hindered amine stabilizer CHIMASSORB® 2020, 182 grams of the benzotriazole UV absorber TINUVIN® 328 and 173 grams of the hindered phenol IRGANOX® 1010 are melted in a Z-blade mixer. 273 grams of the phosphite IRGAFOS® 168 is added and the mixture heated to dissolution at 150° C. The pigments CROMOPHTAL® Yellow 8GNP, CROMOPHTAL® Yellow 3RLP, the inorganic filler strontium Carbonate and 109 grams of inorganic pigment titanium oxide are then added, blended and wetted. The mixture is cooled to room temperature and broken up into granules.

Peparation and Screening of Pigmented Polymer Compositions

Example 5

6 grams of CROMOPHTAL® Orange GP is incorporated into 114 grams rigid PVC on a 2 roll mill at 170° C. with 30% differential roll speed between the front and back roll for 7 minutes to disperse the pigment. The sheet is drawn, cut & pelletized prior to use.

Example 6

30 grams of TiO2 white is incorporated into 90 grams rigid PVC on a 2 roll mill at 170° C. with 30% differential roll speed between the front and back roll for 7 minutes to disperse the pigment. The sheet is drawn, cut & pelletized prior to use.

Example 7

2.16 grams of the material from Example 5 and 6.53 grams of the material from Example 6 are incorporated into 111.31 g of extrusion grade CPVC on a 2 roll mill at 180° C. for 6 minutes. The resulting batch is pressed to a 1.2 mm sheet on a compression molder at 20 tons and 196° C. for 1.5 minutes.

Example 8

0.21 grams of the material from Example 1 and 6.53 grams of the material from Example 6 are incorporated into extrusion grade CPVC resin on a 2 roll mill at 180° C. for 6 minutes. The resulting batch is pressed to a 1.2 mm sheet on a compression molder at 20 tons and 196° C. for 1.5 minutes.

Example 9

0.19 grams of the material from Example 2 and 6.53 grams of the material from Example 6 are incorporated into extrusion grade CPVC resin on a 2 roll mill at 180° C. for 6 minutes. The resulting batch is pressed to 1.2 mm sheet on a compression molder at 20 tons and 196° C. for 1.5 minutes.

Example 10

0.108 grams of the hindered phenol IRGANOX 1076 is physically mixed—not fluxed—with 0.108 grams of the pigment CROMOPHTAL® Orange GP prior combining with 6.53 grams of the material from Example 6 and incorporated into extrusion grade CPVC resin on a 2 roll mill at 180° C. for 6 minutes. The resulting batch is pressed to a 1.2 mm sheet on a compression molder at 20 tons and 196° C. for 1.5 minutes.

CIE color of Examples 7-10 is assessed at 10°(1964) observer using an X-Rite® SP-68 spectrophotometer with Colibri™ QC software and shown below. Examples 8 and 9 containing the low dust pigment composition prepared according to the invention show improved tint strength by DIN when compared to Examples 7 and 10 prepared without the inventive pigment compositions. Str stands for color strength.

| GP/TiO2 in CPVC: | Str. | L* | a* | b* | C* | h* | DL* | Da* | Db* | DC* | DH* | dE* |
|---|---|---|---|---|---|---|---|---|---|---|---|---|
| Ex 7 | 100 | 72.66 | 33.08 | 32.4 | 46.3 | 44.18 | 0 | 0 | 0 | 0 | 0 | 0 |
| Ex 8 | 131 | 71.25 | 34.3 | 36.35 | 49.98 | 46.42 | −1.41 | 1.22 | 3.95 | 3.68 | 1.9 | 4.37 |
| Ex 9 | 124 | 71.56 | 33.06 | 35.63 | 48.6 | 46.9 | −1.1 | −0.02 | 3.23 | 2.3 | 2.27 | 3.41 |
| Ex 10 | 96 | 70.68 | 28.51 | 28.42 | 40.26 | 44.68 | −1.99 | −4.57 | −3.97 | −6.04 | 0.39 | 2.79 |

What is claimed is:

1. A method for preparing a solid, low-dust pigment composition, said pigment composition consisting of
   a) one or more organic and/or inorganic pigment,
   b) one or more hindered phenol or dialkyl hydroxylamine having a melting point of 200° C. or less in a weight ratio of a) to b) of from about 10:1 to about 1:10, and
   c) from 0 to 5% by weight, based on the total weight of the pigment composition, of components other than a) and b)

wherein the pigment is adhered to and in direct contact with the hindered phenol or dialkyl hydroxylamine, which method comprises combining one or more organic and/or inorganic pigment a) with one or more hindered phenol or dialkyl hydroxylamine b) in a ratio of a) to b) of from about 10:1 to about 1:10 and 0 to 5% by weight based on the combined weight of a), b) and c) of component c) to form a mixture which is subjected to high shear mixing with little external heating or no external heating wherein the heat generated by the mixing at high shear is enough to create liquefaction of the hindered phenol or dialkyl hydroxylamine followed by cooling to form the solid low dust pigment composition.

2. A method according to claim 1, wherein the one or more hindered phenol or dialkyl hydroxylamine has a melting point of 170° C. or less.

3. A method according to claim 1, wherein the pigment of component a) contains at least one organic pigment.

4. A method according to claim 1, which is carried out in the absence of a carrier wax and polymer resin.

5. A method according to claim 1, wherein component b) contains at least one ester of β-(3,5-di-tert-butyl-4-hydroxyphenyl)propionic acid with a mono- or polyhydric alcohol.

6. A method according to claim 1, wherein components a), b) and c) are mixed under conditions wherein component b is liquefied, followed by cooling to form a solid pigment composition, the solid pigment composition is then subjected to high shear mixing, or other agitation, with external cooling to prepare pigment particles of the desired particle size.

7. A method according to claim 1, wherein component c) is present in from 0 to 2 weight %.

8. A method according to claim 1, wherein the high shear mixing occurs with no external heating.

* * * * *